(12) United States Patent
Björklund

(10) Patent No.: US 6,411,067 B1
(45) Date of Patent: Jun. 25, 2002

(54) VOLTAGE SOURCE CONVERTERS OPERATING EITHER AS BACK-TO-BACK STATIONS OR AS PARALLEL STATIC VAR COMPENSATORS

(75) Inventor: Hans Björklund, Ludvika (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/785,168

(22) Filed: Feb. 20, 2001

(51) Int. Cl.$^7$ .................................................. G05F 1/70
(52) U.S. Cl. ................................................ 323/207; 363/35
(58) Field of Search .......................... 323/207; 363/34, 363/35, 37

(56) References Cited

U.S. PATENT DOCUMENTS

| | | | | |
|---|---|---|---|---|
| 3,614,461 A | * | 10/1971 | Speer | |
| 4,697,136 A | * | 9/1987 | Ishikawa | 363/34 |
| 4,992,721 A | * | 2/1991 | Latos | 363/37 |
| 5,187,651 A | * | 2/1993 | Ekstrom | 363/35 |
| 5,563,778 A | * | 10/1996 | Oh | 363/37 |
| 5,633,789 A | * | 5/1997 | Kimura et al. | 363/37 |
| 5,867,375 A | * | 2/1999 | Svensson et al. | 363/35 |
| 5,870,293 A | * | 2/1999 | Svensson et al. | 363/37 |
| 6,295,215 B1 | * | 9/2001 | Faria et al. | 363/34 |

* cited by examiner

*Primary Examiner*—Jeffrey Sterrett
(74) *Attorney, Agent, or Firm*—Oblon, Spivak, McClelland, Maier & Neustadt, P.C.

(57) ABSTRACT

A device and a method for controlling the flow of electric power in a transmission line carrying alternating current, in which a first voltage source converter is connected to the transmission line at a first point and a second voltage source converter is connected to the transmission line at a second point. Further, the first and second voltage source converters have their direct current sides connected to a common capacitor unit. Also included is a by-pass switch connected to the transmission line between the first point and the second point in parallel with the first and second voltage source converters so that the first and second voltage source converters will operate as a back-to-back station when the by-pass switch is open and as two parallel static var compensators when the by-pass switch is closed.

13 Claims, 4 Drawing Sheets

VOLTAGE SOURCE CONVERTERS OPERATING EITHER AS BACK-TO-BACK STATIONS OR AS PARALLEL STATIC VAR COMPENSATORS

TECHNICAL FIELD OF THE INVENTION AND PRIOR ART

The present invention relates to a device and a method for controlling the flow of electric power in a transmission line carrying alternating current. The invention also relates to an alternating current network comprising means for controlling the flow of electric power in the network.

In an electric transmission system it is of great importance and value to be able to rapidly and precisely control the flow of electric power so as to adapt the power flow to varying load conditions and to achieve a stable and predictable power flow despite disturbances of different kinds. Different types of devices have been proposed and put into operation for achieving this control of power flow. A device commonly used for this purpose is the so-called Unified Power Flow Controller (UPFC). The UPFC consists of two AC/DC voltage source converters designated as exciter and booster, respectively. The DC sides of both converters are connected to a common capacitor providing a DC voltage support for the converter operation and functioning as an energy storage means. The AC side of the booster inserts a synchronous AC voltage of controllable magnitude and phase angle in series with the transmission line via a series transformer. The AC side of the exciter is connected in parallel to the transmission line via a transformer where a current of controllable magnitude and power factor angle is injected into or absorbed from the transmission line. By means of a UPFC, the active and the reactive power flow through the transmission line can be controlled independently of each other. The main task of the exciter is to control the DC link voltage and to keep it on the reference value by exchanging the specific amount of active power with the transmission line. The secondary task of the exciter is to compensate reactive power as a var compensator so as to keep the line voltage on a constant level.

A UPFC constitutes an efficient device for controlling the flow of electric power in an electric transmission system. However, the series transformer of the UPFC has the full line voltage on both of its sides and must therefore have a high rating, which makes this transformer very costly and bulky.

SUMMARY OF THE INVENTION

The object of the present invention is to provide a device highly effective for controlling the flow of electric power in a transmission line carrying alternating current, which device can be manufactured at relatively low costs.

According to the invention, this object is achieved by a device comprising a first VSC (VSC=Voltage Source Converter) connected to the transmission line at a first point and a second VSC connected to the transmission line at a second point, said first and second VSCs having their DC sides connected to a common capacitor unit, wherein the device further comprises a by-pass switch connected to the transmission line between said first point and said second point in parallel with the first and second VSCs so that the first and second VSCs will operate as a back-to-back station when the by-pass switch is open and as two parallel static var compensators when the by-pass switch is closed.

When the by-pass switch of the inventional device is open and the VSCs operate as a back-to-back station, a powerful control of the flow of electric power in the transmission line can be achieved. During this first mode of operation, the phase, the frequency as well as the magnitude of the alternating voltage in the transmission line can be controlled by means of the device, and the active and reactive power can be controlled independently of each other. When the by-pass switch of the inventional device is closed the VSCs operate as two parallel static var compensators. During this second mode of operation, the device indirectly controls the transmission line voltage, and thereby the transmitted electric power, by generating reactive power for, or absorbing reactive power from, the transmission system. The device is preferably operated in said first mode during time periods when the flow of electric power in the transmission line has to be controlled to a large extent, whereas the device is preferably switched over to said second mode during time periods when only minor regulations or no regulations at all of the power flow are required. When the device is operated in said second mode, the power losses are lower than during operation in said first mode.

The device according to the invention constitutes a very flexible and efficient means for controlling the flow of electric power in a transmission line, which device does not require any costly and bulky transformers for its operation.

As appears from above, the by-pass switch of the device is used for switching between the two above-mentioned modes of operation. Furthermore, the by-pass switch constitutes a safety appliance for the VSCs of the device in that the by-pass switch can be arranged to close when the current in the transmission line becomes so strong that it could damage the components, such as the semiconductor elements, of the VSCs. When the by-pass switch is closed, the current by-passes the back-to-back station constituted by the two VSCs. Consequently, the VSCs do not have to have a rating determined by the maximum line current and can therefore be manufactured at a relatively low cost.

A further advantage with the device according to the invention is that it can be used in a transmission line where there might occur a temporary variance in the frequency of the alternating current on the generating side of the transmission line. When operating in said first mode, i.e. when the VSCs are operating as a back-to-back station, the VSCs of the device can namely be controlled to achieve a stable frequency of the current in the transmission line on one side of the device despite a variance in the frequency of the current in the transmission line on the other side of the device. This cannot be done with a UPFC.

According to a preferred embodiment of the invention, the VSCs comprise semiconductor elements of turn-off type constituted by bipolar transistors with an insulated gate (IGBT=Insulated Gate Bipolar Transistor). It is particularly advantageous to use IGBTs as semiconductor elements of turn-off type in this context, since they may easily be controlled simultaneously, so that they will behave as one single semiconductor element of turn-off type or breaker.

According to another preferred embodiment of the invention, the VSCs are arranged to conduct the current through the device in such a way during the breaking operation of the by-pass switch that essentially no current or only a limited current passes the switch, so as to assist the switch in said breaking operation. In this way, the by-pass switch can have a relatively low rating and can therefore be manufactured at a relatively low cost. Another advantage of the ability to use a by-pass switch having a relatively low rating is that a switch having a low rating can perform the switching operation more rapidly than a switch having a higher rating.

The invention also relates to a method for controlling the flow of electric power in a transmission line carrying alternating current having the features of claim 11, as well as an alternating current network having the features of claim 12.

Further advantages as well as advantageous features of the invention will appear from the following description and the dependent claims.

BRIEF DESCRIPTION OF THE DRAWINGS

With reference to the appended drawings, below follows a specific description of preferred embodiments of the invention cited as examples.

In the drawings.

DETAILED DESCRIPTION OF PREFERRED EMBODIMENTS OF THE INVENTION

Figure 1:
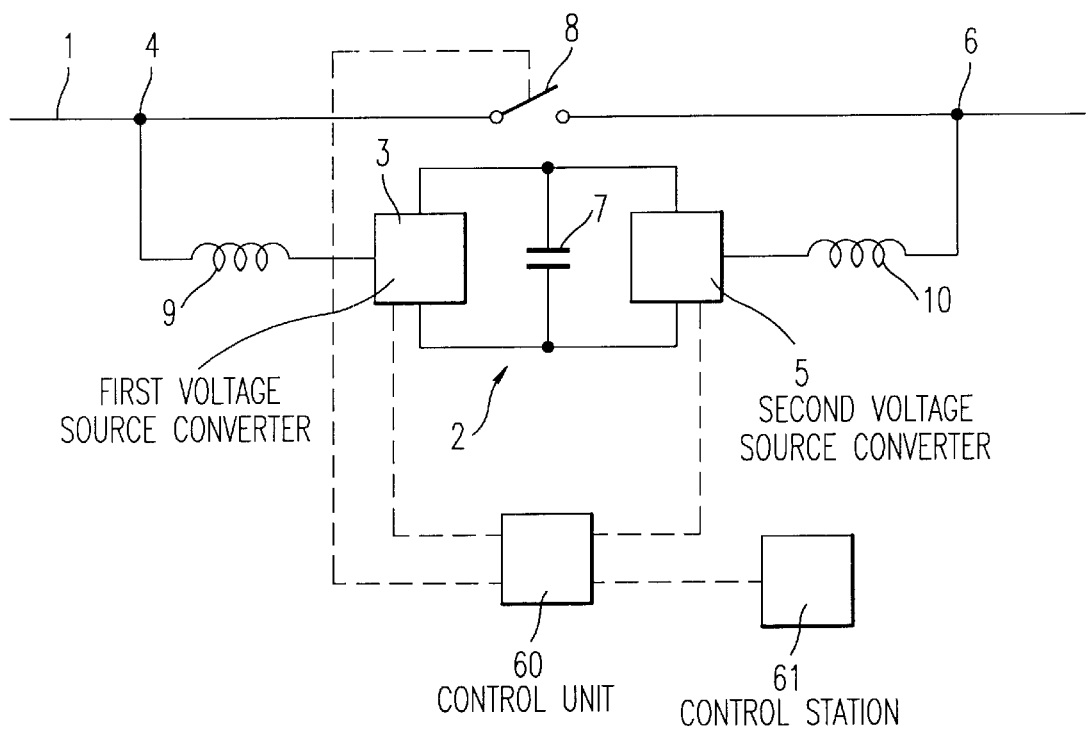
FIG. 1 is a schematic single line diagram illustrating the construction of a device according to the invention.

In FIG. 1 the construction of a device according to the invention is schematically illustrated a single line diagram. A transmission line for carrying alternating current and having one or several phases is denoted as 1. A device for controlling the flow of electric power in this transmission line 1 is denoted as 2. This device 2 comprises a first VSC (VSC=Voltage Source Converter), schematically indicated at 3, connected to the transmission line 1 at a first point 4 and a second VSC, schematically indicated at 5, connected to the transmission line 1 at a second point 6, said first and second VSCs 3, 5 having their DC sides connected to a common capacitor unit 7. Furthermore, the device 2 comprises a by-pass switch 8 connected to the transmission line I between said first point 4 and said second point 5 in parallel with the first and second VSCs 3, 5. Each VSC 3, 5 is preferably connected to the transmission line 1 via a phase reactor 9, 10.

The term VSC-converter, i.e. the type of converter comprised in the device according to the invention, refers to a type of converter previously known through for example the thesis "PWM and control of two and three level High Power Voltage Source Converters" by Anders Lindberg, Royal Institute of Technology, Stockholm, 1995 in which publication a plant for transmitting electric power through a direct voltage network for high voltage direct current (HVDC) while utilizing such a converter is described. Before the creation of this thesis plants for transmitting electric power between a direct voltage network and an alternating voltage network have been based upon the use of network commutated CSC(Current Source Converter)converters in stations for power transmission. However, in this thesis a totally new concept is described, which is based on instead using VSC(Voltage Source Converter)-converters for forced commutation for transmitting electric power between a direct voltage network being voltage stiff therethrough, in the case in question for high voltage direct current, and alternating voltage networks connected thereto, which offers several considerable advantages with respect to the use of network commutated CSC-converters in HVDC, among which it may be mentioned that the consumption of active and reactive power may be controlled independently of each other and that there is no risk for commutation faults in the converter and thereby no risk for transmitting commutation faults between different HVDC-links, which may take place for network commutated CSC-s. There are also further advantages.

It is previously known to use two VSCs connected to each other so as to form a back-to-back station. In a back-to-back station the VSCs have their DC sides connected to a common DC link comprising a capacitor unit and their AC sides connected to a transmission line of an alternating current network. Such a back-to-back station constitutes a powerful means for controlling the flow of electric power in the transmission line. The phase, the frequency as well as the magnitude of the alternating voltage in the transmission line can be controlled by means of such a back-to-back station, and the active and reactive power can be controlled independently of each other. A back-to-back station of this type is often used for connecting two alternating current networks where e.g. the frequency of the alternating current in one of the networks is different from the frequency of the alternating current in the other network. However, a back-to-back station of the type in question can also be used for controlling the flow of electric power in a transmission line of an alternating current network.

It is also previously known that a VSC-converter of conventional type may be used for conversion in. a SVC (Static Var Compensator).

The VSCs 3, 5 illustrated in FIG. 1 may be of any conventional type. Two different designs of VSCs suitable for use in the device according to the invention will be described in more detail below.

Figure 2:
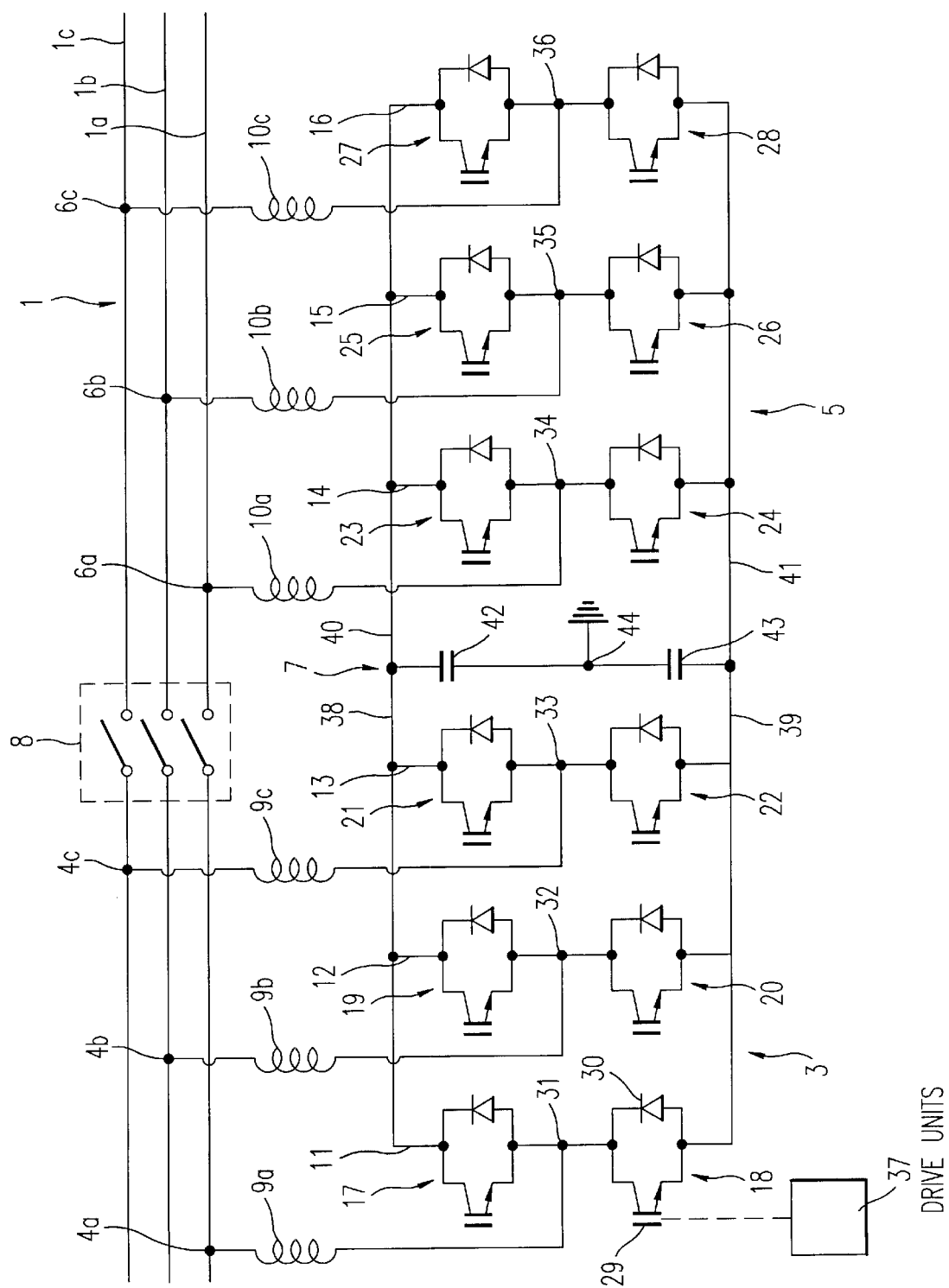
FIG. 2 is a schematic circuit diagram illustrating the construction of a device according to an embodiment of the invention, comprising VSC-converters in the form of so-called six-pulse bridge converters.

In the description of the embodiment of the inventional device illustrated in FIG. 2, the same reference signs as in FIG. 1 will be used for denoting similar details.

In the embodiment of the invention shown in FIG. 2, the device comprises a first VSC 3 and a second VSC 5 of known design, each having a so-called six-pulse bridge. Each VSC has three phase legs 11–16 with two current valves 17–28 connected in series, each current valve being made of a plurality of semiconductor elements 29 of turn-off type connected in series and a plurality of rectifying members 30, preferably in the form of free-wheeling diodes, connected in series and connected in anti-parallel with the semiconductor elements. The series connection of semiconductor elements and rectifying members, respectively, is in FIG. 2 summarized by one single symbol therefore, although they in the practice are present in a comparatively high number so as to be able to hold the high voltage, well in the order of several 100 kV, which has to be held by them jointly in the blocking state of the valve. A middle point of the respective phase leg between said valves forms a phase output 31–36, which through a phase reactor 9a–c, 10a–c is connected to the phase 1a–c of an alternating voltage network. All power semiconductor elements in one valve are intended to be turned on simultaneously, and they are preferably IGBTs, since such elements may be turned on and turned off simultaneously in a reliable way, through signals from drive units provided for each individual semiconductor element. The drive units for the semiconductor elements of one 18 of the current valves are commonly denoted at 37. By controlling the power semiconductor elements of the two VSCs 3, 5 according to a determined pulse width modulation pattern (PWM) the direct voltage across a capacitor unit 7 connected between the respective pole conductors 38–41 on the direct voltage side of the converters may be used for generating a voltage on the desired phase output 31–36, the fundamental tone component of which is an alternating voltage with a desired amplitude, frequency and phase position. In this way, the flow of electric power in the transmission line I may be controlled when the current is arranged to pass through the two VSCs.

In the embodiment shown in FIG. 2, the DC link being common for the two VSCs comprises a capacitor unit 7 having two capacitors 42, 43 connected in series between the respective pole conductors 38–41 on the direct voltage side of each VSC. A point 44 between the two capacitors is normally grounded, as indicated in FIG. 2. The capacitor unit 7 could as well be constituted in other ways. It could e.g. comprise more than two individual capacitors connected in series and/or several sets of series connected capacitors connected in parallel with each other.

The operation of a VSC of the type illustrated in FIG. 2 is well known to a person skilled in the art and will not be further described here.

Each phase output 31–33 of the first VSC 3 is connected to a phase 1a–c of the transmission line 1 at a first point 4a–c of the transmission line and each phase output 34–36 of the second VSC 5 is connected to a phase 1a–c of the transmission line 1 at a second point 6a–c of the transmission line, the phase outputs 31 and 34 being connected to a first phase 1a of the transmission line 1, the phase outputs 32 and 35 to a second phase 1b of the transmission line 1 and the phase outputs 33 and 36 to a third phase 1c of the transmission line 1. A by-pass switch 8 is connected to the transmission line 1 between said first points 4a–4c and said second points 6a–6c in parallel with the two VSCs 3, 5.

Figure 3:
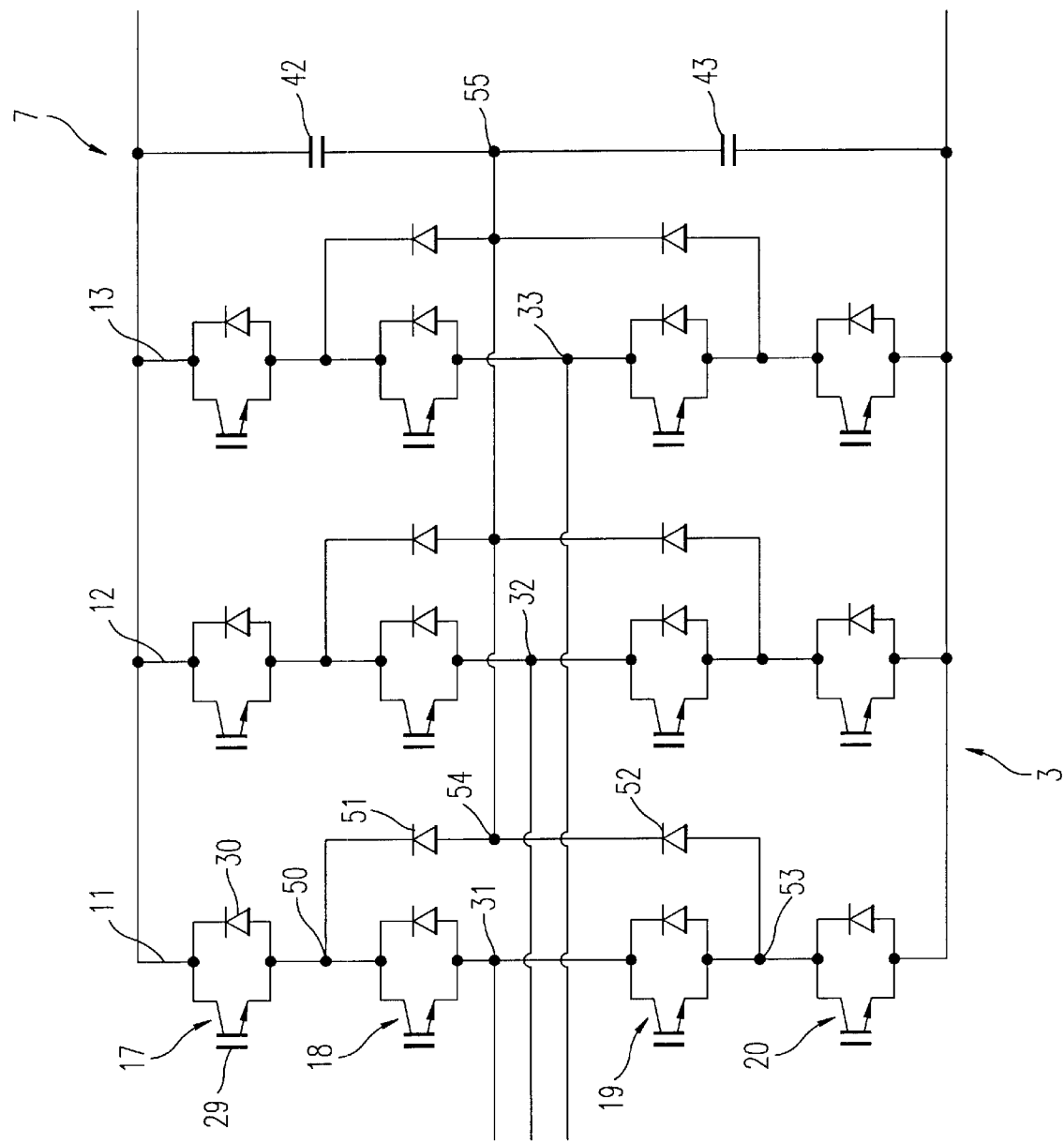
FIG. 3 is a schematic circuit diagram illustrating the construction of a VSC-converter, in the form of so-called three-level converter, included in a preferred embodiment of the device according to the invention.

FIG. 3 illustrates a VSC-converter, in the form of so-called three-level converter, included in a preferred embodiment of the device according to the invention.

In the description of the VSC-converter illustrated in FIG. 3, the same reference signs as in FIGS. 1–2 will be used for denoting similar details.

In FIG. 3 only one of the two VSCs included in the inventional device is shown. In a preferred embodiment of a device according to the invention, the device comprises two VSCs of the type illustrated in FIG. 3, said VSCs having their DC sides connected to a common capacitor unit 7 as illustrated in FIGS. 12 and their AC sides to a transmission line as also illustrated in FIGS. 1–2.

The VSC 3 illustrated in FIG. 3 is a so-called neutral point clamped (NPC) three level converter of known design. The VSC has three phase legs 11–13 with four current valves 17–20 connected in series, each current valve being made of a plurality of semiconductor elements 29 of turn-off type, preferably IGBTs, connected in series and a plurality of rectifying members 30, preferably in the form of free-wheeling diodes, connected in series and connected in anti-parallel with the semiconductor elements. The series connection of semiconductor elements and rectifying members, respectively, is in FIG. 3 summarized by one single symbol therefore, although they in the practice are present in a comparatively high number. A first point 31 of the series connection between the current valves 18 and 19 in a first one 11 of the phase legs, which constitutes a first phase output of the VSC 3, is connected to a phase 1a of the transmission line 1 through a phase reactor 9a. The corresponding points 32, 33 of the other two phase legs 12, 13 are each connected to another of the phases 1b, 1c of the transmission line 1 through a respective phase reactor 9b, 9c. The points 31–33 divide the series connection of each phase leg 11–13 into two similar parts, each part comprising two current valves 17, 18 and 19, 20, respectively. A second point 50 between two current valves 17, 18 in one of said two parts of the series connection is via two series connected clamping diodes 51, 52 connected to a corresponding point 53 between two current valves 19, 20 in the other of said two parts of the series connection. A point 54 between the two clamping diodes 51, 52 is its turn connected to a DC neutral point 55 formed between two series connected capacitors 42, 43 comprised in the capacitor unit 7 of the DC link that is common for both of the VSCs 3, 5. The capacitor unit 7 could as well be constituted in other ways. It could e.g. comprise more than two individual capacitors connected in series and/or several sets of series connected capacitors connected in parallel with each other. As appears from FIG. 3, the other two phase legs 12, 13 of the VSC 3 are designed in the same way as the above described first phase leg 11.

The operation of a VSC of the type illustrated in FIG. 3 is well known to a person skilled in the art and will not be further described here.

The device according to the invention operates as follows. When the by-pass switch 8 is open all the current in the transmission line 1 is fed through the two VSCs 3, 5, which will then operate as a back-to-back station. When the by-pass switch 8 is closed the main part of the current in the transmission line 1 will by-pass the VSCs 3, 5 so that the VSCs then will operate as two parallel static var compensators. In the latter case, the VSCs can when so desired be controlled to let all the current in the transmission line 1 by-pass the VSCs so that the flow of electric power in the transmission line is essentially unaffected by the device.

In order to assist the by-pass switch 8 during its breaking operation, the VSCs 3, 5 could be controlled in such a way that essentially no current or only a limited current passes the switch 8 during said breaking operation.

The by-pass switch 8 of the device could be a breaker or a disconnector controllable to close or open by a control unit, schematically indicated at 60 in FIG. 1. Said control unit 60 could also be connected to the drive units 37 of the VSCs so as to control the operation of the VSCs 3, 5. The control unit 60 arranged to control the operation of an individual device 2 could in its turn be remote-controlled from a control station, schematically indicated at 61 in FIG. 1, which could be common for the individual control units 60 of several inventional devices 2 connected to an alternating current network.

The invention is of course not in any way restricted to the preferred embodiments described above, but many possibilities to modifications thereof will be apparent to a man with ordinary skill in the art without departing from the basic idea of the invention such as defined in the appended claims.

The device according to the invention could of course be adapted to a transmission line having one or two phases instead of three.

Figure 4:
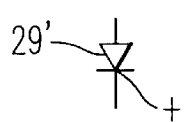
FIG. 4 is a schematic illustration of a Gate Turn-Off (GTO) thyristor which can be used as a semiconductor switching element in the current valves of the present invention.
Figure 5:
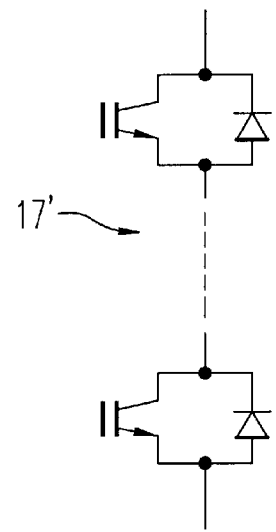
FIG. 5 is a circuit diagram of a current valve including a plurality of semiconductor elements connected in series and a plurality of rectifying members connected in series.

Other semiconductor elements of turn-off type may be used instead of IGBTs in the current valves, for example GTOs (GTO=Gate Turn-Off thyristor). FIG. 4 is an illustration of GTO 29' which can be used as the semiconductor element 29 of FIG. 3. FIG. 5 is a circuit diagram illustrating an implementation where the current valves are in the form of a current valve 17' including a plurality of semiconductor elements connected in series and a plurality of rectifying members connected in series.

What is claimed is:

1. A device for controlling the flow of electric power in a transmission line carrying alternating current, said device comprising:
   a first voltage source converter connected to the transmission line at a first point;
   a second voltage source converter connected to the transmission line at a second point, said first and second voltage source converters having their direct current sides connected to a common capacitor unit;
   a by-pass switch connected to the transmission line between said first point and said second point in parallel with the first and second voltage source converters so that the first and second voltage source converters will operate as a back-to-back station when the by-pass switch is open and as two parallel static var compensators when the by-pass switch is closed.

2. A device according to claim 1, wherein the by-pass switch comprises a breaker.

3. A device according to claim 1, wherein the by-pass switch comprises a disconnector.

4. A device according to claim 1, wherein each voltage source converter has at least one phase leg having at least two current valves connected in series, said valves including at least one semiconductor element of a turn-off type and at least one rectifying member connected in anti-parallel therewith, and
   wherein a mid point of the phase leg between said valves forms a phase output and is connected to a phase of the transmission line.

5. A device according to claim 4, wherein said semiconductor elements of the turn-off type comprise bipolar transistors having an insulated gate.

6. A device according to claim 4, wherein said semiconductor elements of the turn-off type comprise thyristors of a turn-off type.

7. A device according to claim 4, wherein each current valve comprises a plurality of semiconductor elements of a turn-off type connected in series and a plurality of rectifying members connected in series.

8. A device according to claim 1, wherein each voltage source converter is a six pulse bridge converter.

9. A device according to claim 1, wherein each voltage source converter is a three-level converter.

10. A device according to claim 1, wherein the voltage source converters are arranged to conduct the current through the device in such a way during a breaking operation of the by-pass switch that essentially no current or only a limited current passes the by-pass switch so as to assist the by-pass switch in said breaking operation.

11. A method for controlling the flow of electric power in a transmission line carrying alternating current, wherein the alternating current alternatively is conducted through a back-to-back station comprising a first voltage source converter, connected to the transmission line at a first point, a second voltage source converter, connected to the transmission line at a second point, and a direct current link capacitor unit connected between said first and second voltage source converters, or through a by-pass switch arranged in the transmission line between said first point and said second point in parallel with the first and second voltage source converters, said first and second voltage source converters operating as two parallel static var compensators when the alternating current is conducted through the by-pass switch.

12. An alternating current network, comprising:
    devices for controlling the flow of electric power in the network, each device comprising:
      a first voltage source converter connected to a transmission line of the network at a first point; and
        a second voltage source converter connected to said transmission line at a second point, the first and second voltage source converters being connected to a common direct current link capacitor unit;
        a by-pass switch connected to said transmission line between said first point and said second point in parallel with the first and second voltage source converters so that the first and second voltage source converters will operate as a back-to-back station when the by-pass switch is open and as two parallel static var compensators when the by-pass switch is closed; and
      control means connected to the voltage source converters and the by-pass switch for controlling each device.

13. An alternating current network according to claim 12, wherein the control means of several devices are remote-controlled from a common control station.

* * * * *